(12) United States Patent
Nobutani

(10) Patent No.: US 7,648,067 B2
(45) Date of Patent: *Jan. 19, 2010

(54) POS SYSTEM, INPUT/OUTPUT CONTROL APPARATUS FOR USE IN A POS SYSTEM, AND METHOD

(75) Inventor: Tsutomu Nobutani, Toronto (CA)

(73) Assignee: Seiko Epson Corporation (JP)

( * ) Notice: Subject to any disclaimer, the term of this patent is extended or adjusted under 35 U.S.C. 154(b) by 4 days.

This patent is subject to a terminal disclaimer.

(21) Appl. No.: 12/022,945

(22) Filed: Jan. 30, 2008

(65) Prior Publication Data

US 2008/0133374 A1 Jun. 5, 2008

Related U.S. Application Data

(63) Continuation of application No. 11/022,525, filed on Dec. 22, 2004, now Pat. No. 7,344,070.

(30) Foreign Application Priority Data

Mar. 25, 2004 (JP) ............................. 2004-089403

(51) Int. Cl.
*G06K 15/00* (2006.01)
*G06Q 20/00* (2006.01)
(52) U.S. Cl. .................................. 235/383; 705/16
(58) Field of Classification Search ............... 235/381, 235/383; 705/14, 16, 18
See application file for complete search history.

(56) References Cited

U.S. PATENT DOCUMENTS 5,684,291 A 11/1997 Taskett (Continued)

FOREIGN PATENT DOCUMENTS

JP 06-215272 8/1994

(Continued)

OTHER PUBLICATIONS

WO 2004/003866 A1 published on Jan. 8, 2004 incorporating PCT/AU2003/000847.

(Continued)

*Primary Examiner*—Thien M. Le
*Assistant Examiner*—April A Taylor
(74) *Attorney, Agent, or Firm*—Baker & Hustetler, LLP

(57) ABSTRACT

A POS system and method having a POS terminal, at least one input device for providing input data such as product sale information to said POS terminal, a POS server to enable the POS terminal to complete a POS transaction based upon such product sale information, a display device and a printing device further including an input/output control apparatus 12 and at least one function adding server 50 to enable the POS system to perform at least one new functional application without requiring any change in the POS system terminal or server. At least one of connection ports 21b to 23b of an input/output control apparatus 12 is connected to at least one the connection ports 21a to 23a of an existing POS terminal 30 having at least a POS printer 34, a input device 32, or a display 33 connected thereto. The input devices 32 to 34 conventionally connected to the ports 21a to 23a of the POS terminal 30 are connected to the corresponding ports of the I/O control apparatus 12. A function-adding server 50 is also connected to the I/O control apparatus 12. The I/O control apparatus 12 performs an identification operation to determine if input information from the input devices meet specific conditions (identification criteria) and if so additional data is provided by the function-adding server 50 for performing additional functionality.

12 Claims, 11 Drawing Sheets

U.S. PATENT DOCUMENTS

| | | | |
|---|---|---|---|
| 5,712,629 | A | 1/1998 | Curtiss, Jr. et al. |
| 5,721,768 | A | 2/1998 | Stimson et al. |
| 5,903,633 | A | 5/1999 | Lorsch |
| 6,404,869 | B1 | 6/2002 | Henderson et al. |
| 6,644,547 | B1 * | 11/2003 | White ................. 235/381 |
| 7,232,063 | B2 * | 6/2007 | Fandel et al. ............ 235/383 |
| 7,281,251 | B2 * | 10/2007 | Otsuka et al. ............ 719/313 |
| 2002/0138351 | A1 | 9/2002 | Houvener et al. |
| 2003/0135418 | A1 | 7/2003 | Shekhar et al. |
| 2004/0044575 | A1 | 3/2004 | Bakker et al. |
| 2004/0128201 | A1 | 7/2004 | Ofir et al. |

FOREIGN PATENT DOCUMENTS

| | | |
|---|---|---|
| JP | 2002-307765 | 10/2002 |
| JP | 2004-13707 | 1/2004 |
| JP | 2004-13708 | 1/2004 |

OTHER PUBLICATIONS

WO 2002/43014 A2 publised on May 30, 2002 incorporating PCT/US01/43616.

WO 2000/41145 published on Jul. 13, 2000 incorporating PCT/US99/01857.

European Office Action which issued in the corresponding European application No. 04030414.9, citing above references.

Additional Office Action which issued in the corresponding European application No. 04030414.9, citing above references.

* cited by examiner

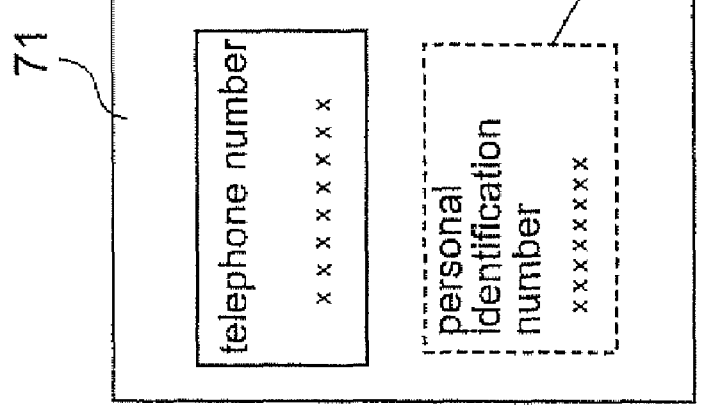
Fig 6(c)
Fig 6(b)
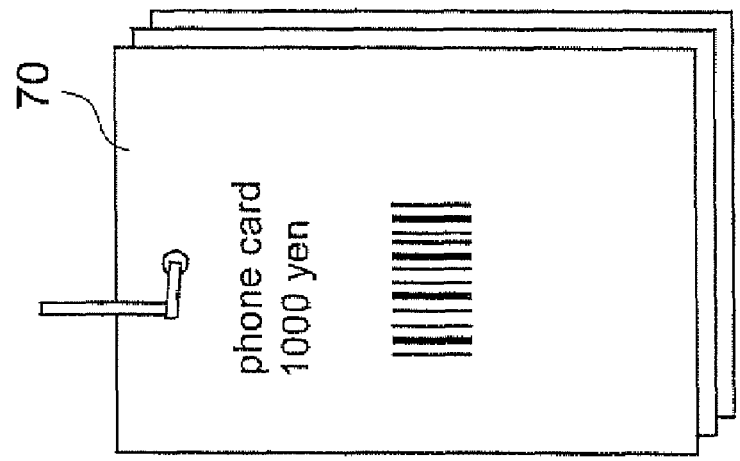
Fig 6(a)

POS SYSTEM, INPUT/OUTPUT CONTROL APPARATUS FOR USE IN A POS SYSTEM, AND METHOD

The present invention is a continuation application of U.S. Ser. No. 11/022,525 which was filed on Dec. 22, 2004 now U.S. Pat. No. 7,344,070 and which was allowed on Oct. 19, 2007.

BACKGROUND OF THE INVENTION

1. Field of the Invention

The present invention relates to a POS system, an input/output control apparatus for use in a POS system in combination with a function-adding server, and a method to enable the POS system to perform at least one new functional application without changing the POS system.

2. Description of Related Art

POS (point-of-sale) systems as used in supermarkets, convenience stores, and other retail sales stores commonly generate data for printing receipts ("receipt-printing data") by adding advertising information, including product advertisements and event announcements, to product information relating to the purchased goods and price information as disclosed in US 2004/0041022A1. The generated receipt-printing data is sent to a printer for printing a receipt. More recent POS systems may also print coupons, lottery tickets, and other information in addition to or instead of advertising information. As a result sales receipts have also become an effective advertising medium.

Adding a function for including such advertising information on printed receipts to existing POS systems not already equipped with the ability to add such advertising information requires a major modification of the existing POS server or POS terminal devices, and this necessitates a major capital investment. As a result, many small retailers must forgo using sales receipts as an effective advertising medium. To resolve this problem, Japanese Unexamined Patent Appl. Pub. 2000-79597 teaches using a method of providing such advertising information by connecting an adapter device between the host terminal and printer of a POS system in order to add to the POS system the function of adding advertising information to a sales receipt with a minimal capital investment and without greatly modifying the POS system. More specifically, this prior art method connects to a central server through an adapter device, and the server supplies the advertising information to the client terminals.

The advantage of the adapter device taught in Japanese Unexamined Patent Appl. Pub. 2000-79597 is the ability to print receipts containing advertising information with a minimal capital investment. The functionality of this adapter device is, however, limited to editing the print data between the server and the printer. More specifically, this system generates print data having advertising information added to the print data received from a host terminal, and supplies the combined receipt print data to the printer. The service that this system can provide is thus limited to adding advertising information from a central server. The adapter device taught in Japanese Unexamined Patent Appl. Pub. 2000-79597 therefore cannot add other new functions or handle complex, varied modifications to the POS system.

A more recent trend in retail sales is the need to provide a variety of services at the point of sale. Providing such services is particularly important as a means of differentiating a store from its competitors. Providing such services as issuing phone cards, accepting utility payments, and digitally processing checks at the point of sale in a retail store helps differentiate one store from another and improves customer service. As a result, introducing a system that makes providing such services possible before the competition provides a direct and immediate business advantage.

However, providing such a wide range of value-added services requires major modification of the POS server and POS terminal application, and thus a significant capital investment. For a small retail store to frequently change the POS system application in order to offer new services, and provide such value-added services in a timely manner, is therefore difficult.

The present invention is directed to a POS system, input/output control apparatus for use in a POS system and to a method for solving the foregoing problems without changing the existing POS application.

SUMMARY OF THE INVENTION

The POS system according to a preferred embodiment of the present invention has an input device for entering transaction information including purchased product information; a display device provides an input/output (I/O) control apparatus for relaying data communication between a POS terminal and an input device and a POS printer, and enables freely connecting various devices to the I/O control apparatus, which enables the devices to access each other through the I/O control apparatus. As a result, new functions can be added to the POS system without modifying the POS terminal application or the POS server application. New added functionality can therefore be achieved at low cost. In addition. New services provided by a content provider over a network can be easily incorporated into the POS system.

The POS system in the preferred embodiment includes a customer display for displaying transaction information and other display data; a printing apparatus for printing transaction information and other print data; a POS terminal for acquiring data from the input device, calculating a purchase total, and generating and outputting at least a part of the display data and a part of the print data; at least one function-adding apparatus for providing a new function to the POS terminal; and an input/output control apparatus connected to the POS terminal, the function-adding apparatus, and at least one of the input device, display device, and printing apparatus, for providing data communication between the devices connected to the input/output control apparatus. The input/output control apparatus has an identification unit for determining if received data from all or at least one of the connected devices meets a specific identification criterion; a processing procedure memory for storing a processing procedure for each defined identification criterion a first process that is executed when the received data does not meet the specific identification criterion, a second process that is executed when the received data meets the specific identification criterion; and a data processing unit for processing the received data according to the processing procedure based on the identification result of the identification unit, and for outputting all or a part of the received data to one or more of the connected devices.

Devices other than input devices and display devices can also be connected to the input/output control apparatus in addition to printers. In addition, when entering or displaying data specific to a function added by the function-adding apparatus is required, the appropriate input device or display device can be connected for the data input or display required for an intermediate operation.

Preferably, the input/output control apparatus also has an identification criteria storage unit for storing identification criteria specific to each input port or identification criteria common to a plurality of input ports; and a data storage unit for storing received data from the input ports.

This aspect of the invention can thus store data received through each input port, and process and output the data as required to a particular device. Furthermore, after sending received data to another device, response data from that device can be edited with the stored received data.

Yet further preferably, a second printing apparatus or other device can be connected to the input/output control apparatus according to the function provided by the function-adding apparatus.

This aspect of the invention enables providing new added functions by simply adding a device having the required function to an existing POS system while using the existing POS system devices as usual. When single-function printers are used, this enables effectively using existing printer resources.

Yet further preferably, the data processing unit can change the identification criteria by running the second process.

Thus comprised, the second process can be written to add new identification criteria to the identification criteria of a specific port, or to change the specific identification criteria, when specific data is received. The second process can thus efficiently execute processes communicating plural times with plural devices according to the sequence of the processes. This also reduces the identification load on the identification unit.

Yet further preferably, the input/output control apparatus, based on the second process, can selectively output all or part of the received data to a connected device according to the type of data received data from the function-adding apparatus.

Including a specific identification code (identification information) in the transmission data from the function-adding apparatus in this aspect of the invention enables the input/output control apparatus to identify the type of data received and to selectively assign the device address to which the received data is sent based on the data type.

Yet further preferably, the function-adding apparatus is a value-added-information server for outputting issued information including all or at least one of a personal identification number corresponding to transmission data from the input/output control apparatus, update data updated based on the transmission data, and extracted data retrieved by searching a specific database based on the transmission data. When the input/output control apparatus detects matching information meeting the identification criterion in the received data, the input/output control apparatus sends the matching information as the transmission data to the value-added-information server according to the second process, and outputs information received from the value-added-information server as print data to the POS printer or other printing apparatus.

This aspect of the invention enables adding a phone card issuing function to a POS system, and thus enables issuing phone cards at a checkout counter. Because the card presented by a customer at the checkout counter to purchase a phone card is not validated as a usable phone card unless the transaction process is completed, no damage results if a purchasing card is stolen. This phone card issuing function is thus secure.

Yet further preferably, the input/output control apparatus is connected to the POS printer, print data is output from the POS terminal to the POS printer through the input/output control apparatus, and when the input/output control apparatus detects matching information in the print data received from the POS terminal, the input/output control apparatus sends the matching information as the transmission data to the value-added-information server. A phone card is thus issued when the input/output control apparatus detects a phone card purchase.

Yet further preferably, the input/output control apparatus is connected to the POS printer and an input device, and the POS terminal communicates with the POS printer and input device through the input/output control apparatus, and when the input/output control apparatus detects matching information in the received data received from the input device, the input/output control apparatus sends the matching information as the transmission data to the value-added-information server. Thus comprised, if the input/output control apparatus detects that the purchased product information from the input device represents a phone card purchase, a phone card is issued.

Yet further preferably, at least a customer display and a customer input device enabling data entry by a customer are connected to the input/output control apparatus;

the value-added-information server comprises a personal identification number processing unit for requesting input of a personal identification number to the input/output control apparatus when information matching the identification criteria is received, and issuing additional information when the input personal identification number meets a specific condition; and when a personal identification number input request is received from the value-added-information server, the input/output control apparatus presents a message on the customer display prompting input of a personal identification number, and sends the personal identification number input from the customer input device to the value-added-information server.

This enables using the personal identification number desired by the customer as the personal identification number for calling using the phone card. By thus using a personal identification number specific to the customer, using the phone card is easier for the customer.

Yet further preferably, the POS printer or the second printing apparatus prints the issued information sent from the value-added-information server. This enables printing information on the back of the card used to purchase a phone card, for example, and thus enables using these purchasing cards more efficiently. Yet further, printing the personal identification number on the card could be omitted if so desired by the customer.

In a POS system according to another aspect of the invention, the POS printer or second printing apparatus distributes and prints issued information sent from the value-added-information server on a plurality of printers. This enables printing the telephone number on the purchased phone card and printing the personal identification number on the receipt, for example. When the personal identification number desired by the customer is entered when a phone card is purchased, printing the personal identification number on the phone card is not necessarily required. Printing the personal identification number on the phone card is also undesirable considering the possibility of loss or theft. As a result, printing the personal identification number only on the receipt is safer. Whether to print the personal identification number on the phone card, on the receipt, or not at all can be decided by the customer.

An input/output control apparatus according to the present invention is used in a POS system having an input device for entering transaction information including purchased product information, a display device including a customer display for displaying transaction information and other display data, a printing apparatus for printing transaction information and other print data, and a POS terminal for acquiring data from the input device, calculating a purchase (sum) total, and generating and outputting the display data and the print data, The input/output control apparatus is connected to at least one of the input device, display device, and printing apparatus, the POS terminal, and at least one function-adding apparatus for providing a function not provided by the POS terminal, and relays data communication between the connected devices by means of an identification unit for determining if received data from all of the connected devices meets a specific identification criterion; a processing procedure memory for storing a processing procedure defining for each identification criterion a first process that is executed when the received data does not meet the specific identification criterion, and a second process that is executed when the received data meets the specific identification criterion; and a data processing unit for processing the received data according to the processing procedure based on the identification result of the identification unit, and outputting the received data to a connected device.

Another aspect of the present invention is a method for adding application functionality to a POS system having a POS terminal, at least one input device for providing input data such as product sale information to said POS terminal, a POS server to enable the POS terminal to complete a POS transaction based upon such product sale information, a display device and a printing device comprising the steps of interconnecting an input/output control apparatus and at least one function adding apparatus to at least one device selected from the group consisting of, one or more of said input devices, said display device and said printing device and to said POS terminal such that said input/output control apparatus receives input data from each of said devices and provides for data communication between said interconnected devices based upon said received data in accordance with the steps of;

(a) performing an identification operation to determine if the received data from said device(s) contains a specific identification criterion;

(b) executing a first process of sending the received data to the POS terminal or printing apparatus when the received data does not meet the specific identification criterion;

(c) executing a second process of sending said received data to said function adding apparatus when the received data meets the specific identification criterion instead of sending the received data to the POS terminal or in addition thereto; and (d) generating additional data from said function adding apparatus in response to the specific identification criterion to enable the POS system to perform at least one additional function independent of the function performed when the received data does not meet the specific identification criterion.

Other advantages and attainments together with a fuller understanding of the invention will become apparent and appreciated by referring to the following description and claims taken in conjunction with the accompanying drawings.

BRIEF DESCRIPTION OF THE DRAWINGS

FIG. 6A shows an example of a purchasing card for purchasing a 1000-yen phone card, FIG. 6B shows an example of a phone number and access code printed on the back of a purchasing card 70; and FIG. 5C shows an example of the printed receipt;

DESCRIPTION OF THE PREFERRED EMBODIMENTS

A POS system, input/output control apparatus, and POS printer (printing apparatus) according to a preferred embodiment of the present invention are described below with reference to the accompanying figures. The present invention easily adds new functionality to an existing POS (point-of-sale) system having a POS terminal for transaction processing of purchased products, one or more input device(s) for entering purchased product data to the POS terminal, and one or more POS printer(s) for printing print data from a POS terminal to a receipt. Therefore, depending upon the function being added, all or some of the input devices and the POS printers (including existing input devices and printers) are connected through the input/output control apparatus to the POS terminal.

The input/output control apparatus relays data transmissions between the POS terminals and other devices connected thereto. When relaying data received from one connected device (hereinafter "received data") to another device, the input/output control apparatus first checks whether data meeting specific identification criteria is contained in the received data. If this data is detected, the input/output control apparatus sends the received data to a device providing the added functionality to process this data, and thereby enables providing additional functionality. A POS system providing new value-added services can thus be provided without modifying the existing POS server application or POS terminal application.

This invention is described in detail below using by way of example a POS system such as used in supermarkets and convenience stores for processing sale transactions and issuing receipts based on input data relating to the purchased products entered by an operator.

A POS System According to a First Embodiment of the Invention

Figure 1:
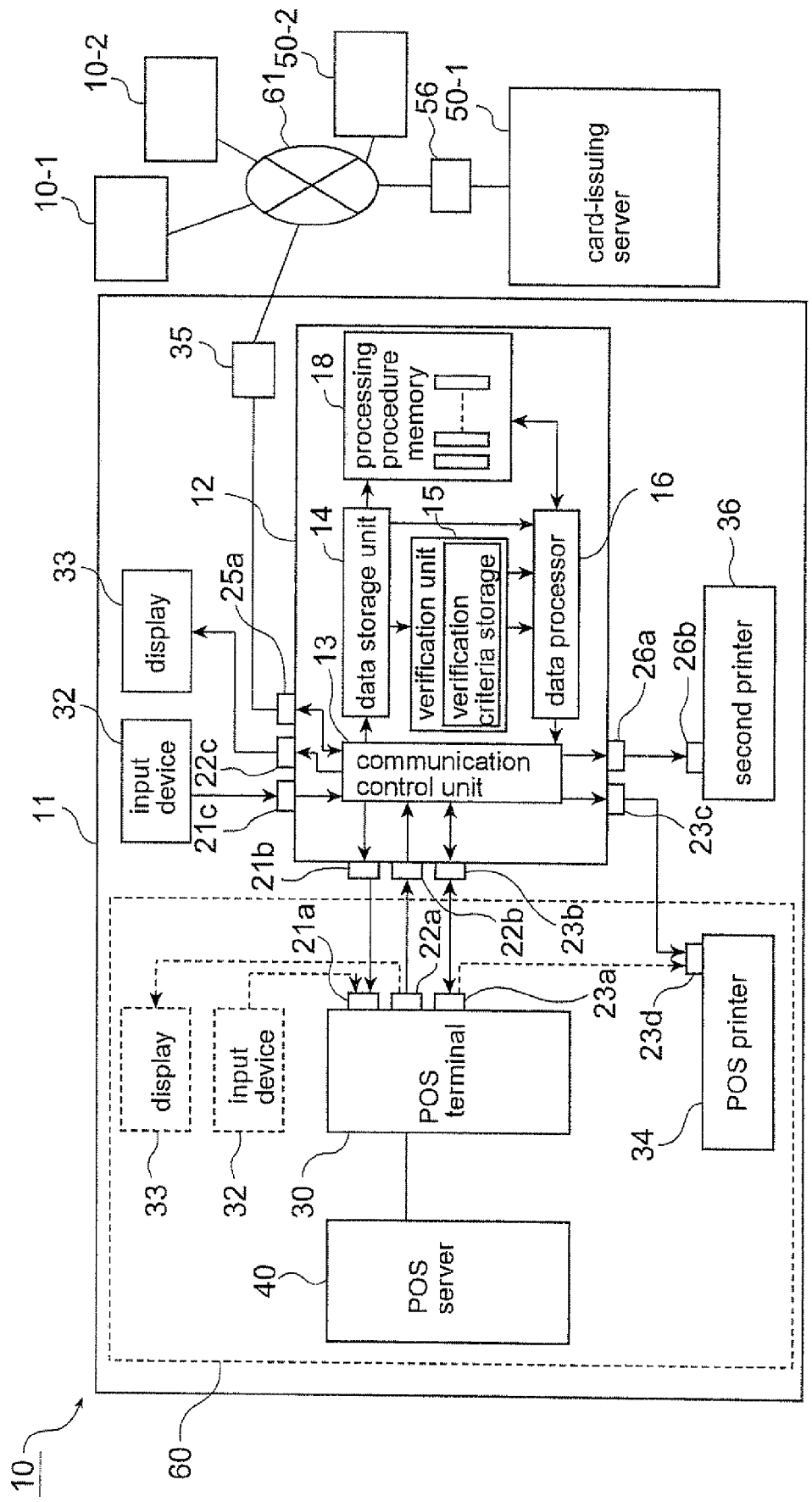
FIG. 1 is a function block diagram of a POS system and input/output control apparatus according to a first embodiment of the present invention.

FIG. 1 shows a POS system 10 and input/output (I/O) control apparatus 12 according to a first embodiment of the present invention. An existing POS system is denoted by dotted line 60 in FIG. 1. In an existing POS system 60, the input device 32 and display 33 as indicated by dotted lines, and the POS printer 34 indicated by a solid line, are connected to the input/output (I/O) ports of the POS terminal 30. In this embodiment of the invention, the input device 32, display 33, and POS printer 34 are reconnected to the POS terminal 30 through the I/O control apparatus 12.

A function-adding apparatus for adding new functions may also be connected to this existing POS system 60. A plurality of function-adding servers 50-1, 50-2 (collectively referred to as "function-adding servers" 50) are connected to an external network such as the Internet for providing the function-adding apparatuses in the embodiment shown in FIG. 1. The function-adding servers 50 are connected to the I/O control apparatus 12 through a communications device 35. Other POS systems 10-1, 10-2 may also be connected to one or more of the function-adding apparatus over the same network. All or at least one of an input device, display, and POS printer is connected to a POS terminal through an input/output control apparatus in each of the other POS systems 10-1, 10-2.

Basic POS System Operation

To more easily understand the present invention, the basic operation of a typical existing POS system 60 (the part enclosed in dotted line box 60 in FIG. 1) is first described briefly below.

This POS system is typically installed at the checkout counter of a store, and has a barcode reader, keyboard, or other input device, and a display device connected to a POS terminal. In this example, the display device includes an operator display for operator use, and a customer display for customer use. A barcode that contains at least a product code and is applied somewhere on the product is read using the barcode reader, and other essential information, such as the quantity purchased, is entered using a keyboard. The entered data is presented both on the operator display and customer display or other display device. All input devices connected to the POS terminal, including the barcode reader and keyboard in this example, are collectively represented by the input device 32 in FIG. 1. The product code scanned by the barcode reader and the quantity information entered from the keyboard (input device 32) are sent directly to the POS terminal.

The POS terminal 30 usually sends the data to the POS server 40, which is connected over a network. The POS server 40 then finds the product name, price, and other information about the product based on the received product code of the purchased product, and sends this product information back to the POS terminal 30.

The POS terminal 30 then displays the transaction data, including the product name, quantity, and price of each purchased product, on the operator and customer displays. When transaction data for all purchased products has been entered, the sum total of the purchased products is calculated and displayed. The purchase total is also sent to the POS server 40.

The POS server 40 then completes the transaction by updating inventory data and sales information based on the transaction data received from the POS terminal 30.

Based on information received from the POS server 40, the POS terminal 30 stores the transaction data to an electronic storage medium, and outputs print data to the POS printer 34.

The POS printer 34 then generates data for printing a receipt (receipt-printing data) from the received print data, and prints a receipt.

Connections

The I/O control apparatus 12 of the present invention is connected between the POS terminal 30 and to all or at least one of the input devices 32, display 33, and POS printer 34 in the existing POS system 60.

How each part of a POS system according to this embodiment of the invention is connected is described first. To more easily understand the features of the present invention, the input device 32, display 33, and POS printer 34 are all reconnected through the I/O control apparatus 12 to the POS terminal 30 in the preferred embodiment of the invention described first below. This arrangement is shown as POS system 11 in FIG. 1. Note, however, that any desired selection of components could be connected to the POS terminal 30 through the I/O control apparatus 12, including only the input device 32, only the POS printer 34, or only an input device and POS printer.

Functions that could be added to the existing POS system 60 could include connecting new input devices other than the input devices 32 described above, including, for example, a customer input device used by customers to enter a personal identification number or a card reader for reading magnetically encoded data from a credit card, or connecting a POS printer with a built-in image scanner (such as further described with reference to FIG. 10).

A POS system according to the present invention thus enables freely connecting any peripheral device, except for the POS server, into the POS system to the POS terminal through the I/O control apparatus 12. This I/O control apparatus 12 has a plurality of communication ports for connecting the devices. The communication ports could be input ports, output ports, and input/output ports, and any desirable number of communication ports could be provided.

A POS system according to the present invention could also have at least one POS printer and/or one or more input device and/or one or more display device connected to a plurality of input/output control apparatuses. In this type of arrangement each input/output control apparatus manages data communication between the POS printer or input device or display device connected thereto, and another input/output control apparatus or function-adding apparatus or POS terminal, All or part of the information sent from a function-adding apparatus or one of the plurality of input/output control apparatuses is sent to one or all of a second and other input/output control apparatuses as the receiving device. Of the data received by an input/output control apparatus, data satisfying the identification criteria of a particular input/output control apparatus is stored by that input/output control apparatus, which then runs a particular printing or display process based on that data.

Input Device Connection

Input devices 32 such as a barcode reader, barcode scanner, keyboard, and image scanner are connected to an input port 21c of the I/O control apparatus 12. When the I/O control apparatus 12 receives input data (mainly purchased product data in the present embodiment) from the input device 32, the I/O control apparatus 12 outputs the received data from an output port 21b. This output port 21b is connected to an input port 21a of the POS terminal 30.

The input ports 21a of the POS terminal 30 are the same as the input port to which the input device 32 is connected in the existing POS system. Input data from an input device 32 can thus be handled in the same way as input data in an existing POS system without modifying the POS terminal application in any way.

An input device 32 as used herein includes any input device that can be connected to the existing POS system, including operator keyboards, barcode scanners, and image scanners. When different input devices are connected to different types of ports in the existing POS terminal 30, the output port of the I/O control apparatus 12 is connected to the corresponding port of the POS terminal 30.

Display Device Connection

FIG. 1 shows a display 33 connected through the I/O control apparatus 12 to the POS terminal 30. The display 33 is connected to an output port 22c of the I/O control apparatus 12. The display 33 includes both customer and operator display devices. If the POS terminal 30 has a built-in operator display, then only the customer display is connected through the I/O control apparatus 12 to the POS terminal 30. In addition to transaction information output from the output port 22a of the POS terminal to the input port 22b of the I/O control apparatus 12, the information displayed on the display 33 includes print data received from a function-adding server (as further described below).

Printer Connection

The POS printer 34 is also connected through the I/O control apparatus 12. The output port 23a of the POS terminal 30 is connected to the input/output port 23b of the I/O control apparatus 12. The POS printer 34 is also connected to an output port 23c of the I/O control apparatus 12. The I/O control apparatus 12 sends print data received from the POS terminal 30 through output port 23c to the POS printer 34. The I/O control apparatus 12 can also output print data received from a function-adding server 50 to the POS printer 34. If the existing POS printer 34 is lacking a desired print function, a second printer 36 could be connected. If the existing POS printer 34 cannot print certain kinds of slips (forms) or print on certain kinds of print media, for example, a second printer 36 could be connected to handle these print functions.

Function-Adding Server Connection

The function-adding servers 50 are connected to I/O port 25a of the I/O control apparatus 12. The communications device 35 can preferably accommodate secure connections and provide security functions such as those of a virtual private network to ensure security of communication between the server 50 and the I/O control apparatus 12. The arrangement shown in FIG. 1 anticipates connecting through a communications device 35 with a VPN router function to the Internet or other external network 61, but the POS system 11 could be connected to the function-adding server 50 through an in-house LAN.

As shown in FIG. 1, the POS system 11 of the present invention is not limited to connecting only one function-adding server 50 to the I/O control apparatus 12, and a plurality of function-adding servers 50 each providing different added functionality could be connected. More particularly, a continually growing range of services providing different types of content are expected to become increasingly available. Using an input/output control apparatus according to the present invention will make it simple to introduce in a timely manner a system providing a wide range of value-added services using external resources without modifying the basic infrastructure (particularly the POS server and POS application) of a company's existing POS system.

Note that a function-adding apparatus as used herein includes using a server providing specific additional functionality, such as using a phone card server when issuing a new phone card as further described below. This type of server is called an "value-added-information server" below.

Figure 4:
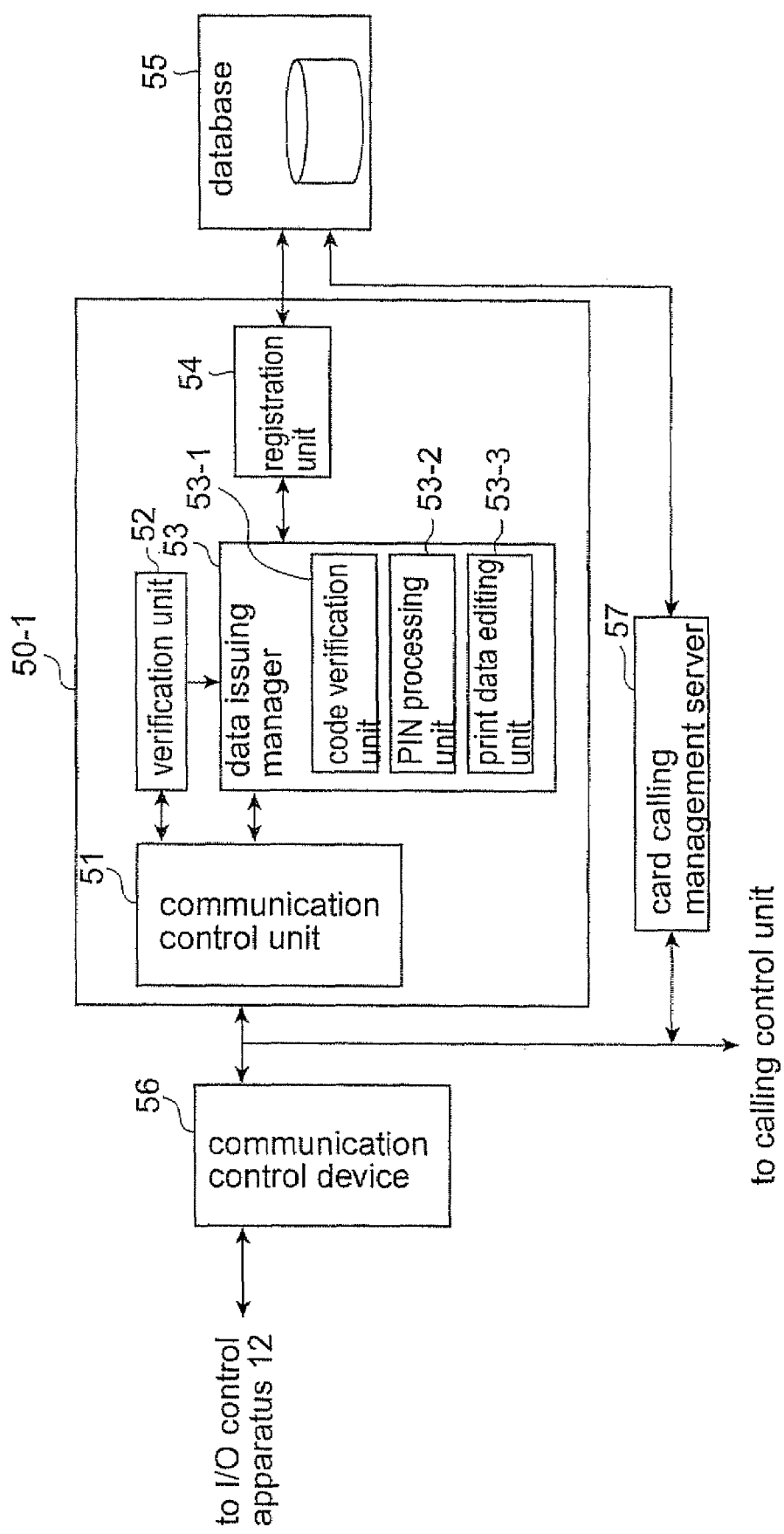
FIG. 4 is a block diagram of a preferred embodiment of the card-issuing server 50-1.

The function-adding server 50 stores data received from an input/output control apparatus in a database 55 (see FIG. 4). In response to operator commands received from the input/output control apparatus, the function-adding server 50 also executes typical database operations on the database 55, including searching and serving data, data backup, computation, deletion, compression and expansion, encryption and decryption, printing, and display processes.

Input/Output Control Apparatus

The basic configuration of an input/output control apparatus according to this embodiment of the invention is described next. An I/O control apparatus 12 according to this embodiment of the invention has a communication control unit 13 for controlling communication with the devices connected to the multiple communication ports, a data storage unit 14 for temporarily storing data received from the communication ports, an identification unit 15 for interpreting the received data, a processing procedure memory 18, and a data processor 16 for editing transmission data and generating communication data such as the transmission data address. The processing procedure memory 18 stores the procedures for processing received data according to specified identification conditions, and data used in those processes.

The data storage unit 14 stores the received data separately for each input port. The stored received data is then used for transmission data editing by the data processor 16. The data storage unit 14 is not be limited to storing only received data. The I/O control apparatus 12 can store all or part of the received data together with all or at least one of the following: data for identifying the I/O control apparatus 12, data identifying the operator, and data identifying the date. Furthermore, data can be stored in a compressed format or in the raw (uncompressed) data format. The received data is then transferred from the data storage unit 14 to the function-adding server 50 at regular intervals, when requested by the function-adding server 50, when the remaining capacity in the data storage unit 14 reaches a specified level, or when the received data satisfies specific conditions. The transmission data is automatically encrypted and decrypted during transmission.

The specific test (identification) conditions are stored in the identification unit 15. If a phone card issuing service is provided as the added function, for example, the calling card product number and all or part of the product name (such as "phone") are stored as the identification conditions and compared with the received data. Based on the result of this comparison, the received data is edited according to a procedure stored in the processing procedure memory 18. The data processor 16 also generates communication data relating to the addressed device based on the data from the processing procedure memory 18 to assure that the transmission data is sent correctly. As a result, the communication control unit 13 can thus appropriately arbitrate sending the received data to the addressed device.

The processing procedure memory 18 stores the procedures for processing received data relayed by the I/O control apparatus 12 and the data required to run these procedures according to the received data and added function. The I/O control apparatus 12 can therefore relay received data to all devices connected thereto.

Figure 2:
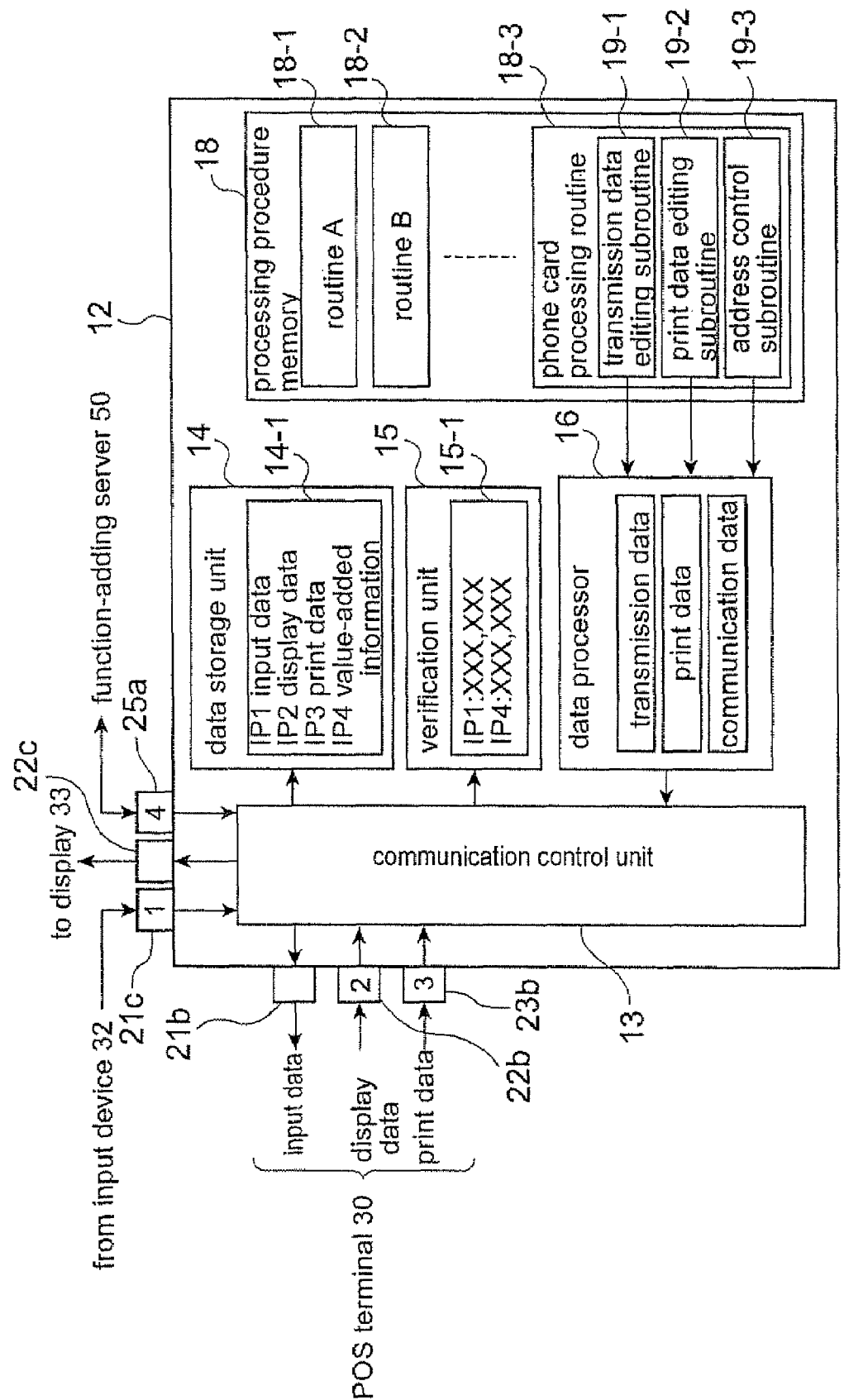
FIG. 2 is a function block diagram of an input/output control apparatus according to a first embodiment of the present invention.

The I/O control apparatus 12 is described in detail below with reference to FIG. 2. FIG. 2 is a function block diagram of an input/output control apparatus according to this embodiment of the invention. The numerals assigned to the communication ports in FIG. 2 are added for the convenience of clearly identifying the input port or input/output port where the data is received. Note that unless needed to identify a port as an input/output port, the communication ports are referred to below as simply input ports and output ports.

The data storage unit 14 stores received data from input ports 1 to 4. Data received through input port 1 is input data such as purchased product data input from the input device 32. Data received through input port 2 is display data output from the POS terminal 30 for presentation on the display 33.

Data received through input port 4 is print data input from the POS terminal 30 and data received from the function-adding servers 50.

Data output from the function-adding servers 50 to the I/O control apparatus 12 includes, for example, display information such as prompts and guidance helping the operator (user) perform operations such as entering a personal identification number, print data relating to an added function, and specific data for the POS terminal 30 in conjunction with an added function. A code or symbol identifying the specific data is added to the transmission data for identification by the identification unit 15 of the I/O control apparatus 12. The procedure to be run when this information is received is stored in the processing procedure memory 18 as a routine. Content stored in the processing procedure memory 18 can preferably be added to or updated from a function-adding server 50 or input device 32 under specific identification conditions.

The identification unit 15 determines whether the received data meets specific identification criteria. The identification unit 15 compares the received data with identification criteria stored in an identification criteria storage unit 15-1 to determine whether to process the received data using a specific routine stored in the processing procedure memory 18. More specifically, if the received data does not satisfy the identification criteria, a normal process (first process) is run, but if the data meets the criteria, a specific routine (second process) is run in addition to or in place of the normal process.

The function provided by the function-adding apparatus in the following example issues a phone card for a specific calling service based on the purchase price. The specific identification criteria for this service is the product code of the phone card. A phone card processing routine 18-3 is also stored in the processing procedure memory 18. This phone card processing routine 18-3 includes subroutines for a transmission data editing process 191, a print data editing process 19-2, and an address control process 19-3 in this embodiment.

If the received data from the input device 32 does not contain the registered print data (identification criteria), the normal process is run, that is, the received data from input port 1 is passed directly from communication (output) port 21b to the input port 21a of the POS terminal 30 (first process).

If a phone card product code is detected in the received data, however, a second process is run in addition to the first process. In the second process the I/O control apparatus 12 sends phone card purchasing information (i.e., matching information) to the function-adding server 50. So that specific data sent from the function-adding server 50 is appropriately processed within the second process, part of the specific identification criteria stored in the input/output control apparatus could be overwritten (temporarily adding a specific identification code as an identification condition). The function-adding server 50 stores information for issuing a phone card, and sends display information with a specific ID code to the I/O control apparatus 12. This display information is used to display a prompt asking the user to enter a personal identification number for using the phone card on the customer display 33.

When the identification unit 15 of the I/O control apparatus 12 detects the specific ID code in the received data from the function-adding server 50, the received data is sent through communication port 22c to the display 33 according to the specified process in the processing procedure memory 18 (the phone card processing routine 18-3 in this example). When the customer enters the personal identification number from the input device, the received data from the input device is checked by the identification unit 15 of the I/O control apparatus 12. This received data is then sent to the function-adding server 50 according to a specified process (second process).

The function-adding server 50 stores an issued phone card record in the database 55, and sends the specific ID code with the personal identification number and telephone number providing the calling service to the I/O control apparatus 12. When the identification unit 15 of the I/O control apparatus 12 detects the specific ID code, the I/O control apparatus 12 sends the received data according to the specified process to the POS printer 34 or second printer 36. Note that if a print data editing subroutine 19-2 for editing the print data is provided as shown in FIG. 2, the I/O control apparatus 12 could edit the received data according to a specified print format to generate the print data, and send the resulting print data to the printer.

The I/O control apparatus 12 can be achieved using a hardware configuration having CPU, ROM, RAM, and a communication control circuit, and a control program.

The control processes and routines shown in FIG. 2 are software constructions, but could be embodied in an ASIC chip or other hardware (logic circuit) design to enable faster operation. These logic circuits could also be integrated in a single chip.

The communication interface of the input device 32, display 33, and printers 34, 36 could be an RS-232C or other serial data interface, a Centronics® or other parallel data interface, a network interface, or a USB or other data transfer protocol. This also applies to the communication interface with the POS terminal 30.

When the drive voltage level used in the POS terminal 30 or POS printer 34, for example, differs from the TTL (transistor-transistor logic) level of the I/O control apparatus 12, a driver circuit for handling level conversions between the communication interfaces is also preferably provided.

An arrangement having a plurality of input/output control apparatuses connected to the function-adding apparatuses and at least one of the input/output control apparatuses not connected to the POS terminal is also possible.

POS Terminal and POS Server

Figure 3:
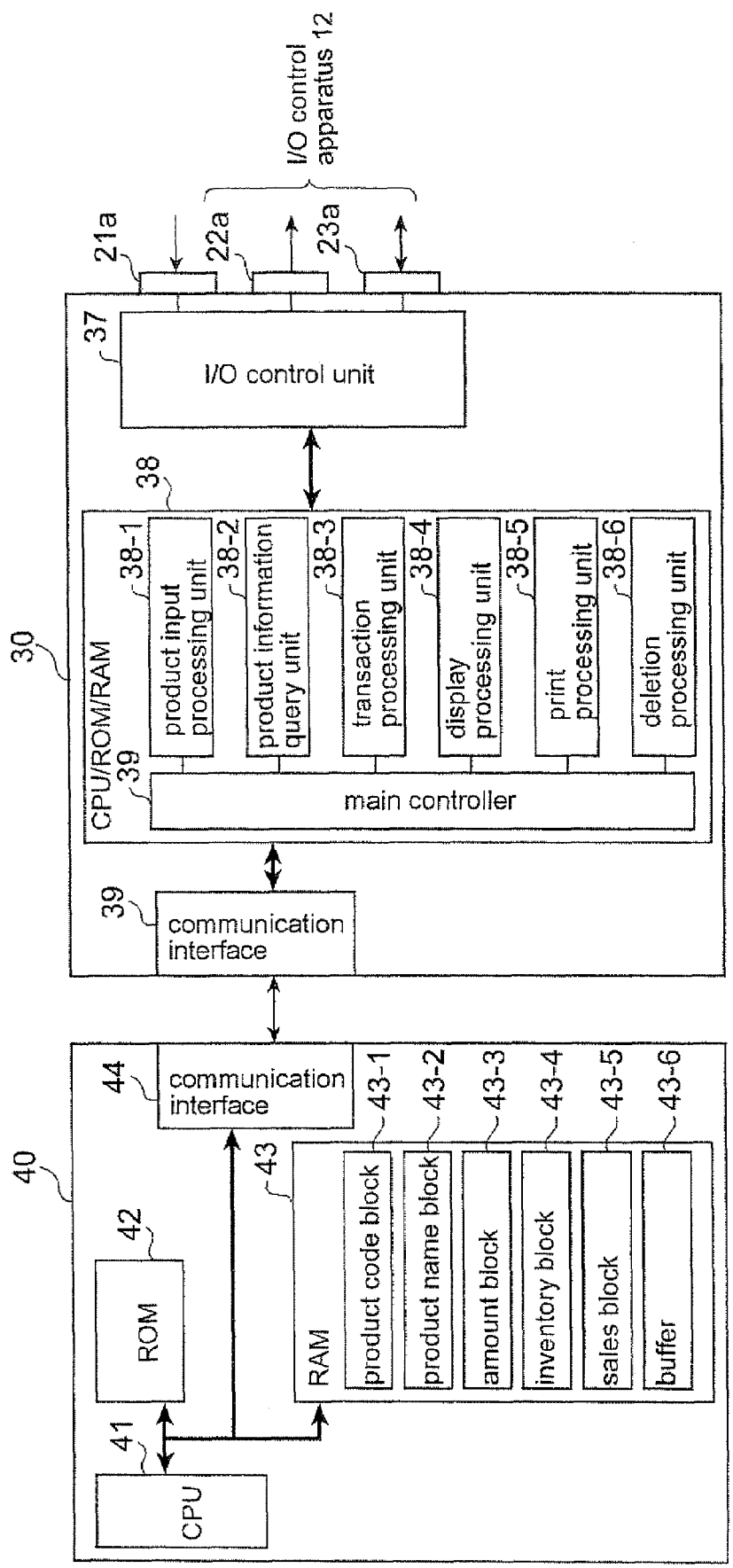
FIG. 3 is a block diagram showing the basic configuration of a POS terminal and POS server according to the present invention.

FIG. 3 is a block diagram showing the basic configuration of a POS terminal and POS server. The POS terminal 30 has a terminal control unit 38 composed of a CPU, ROM, RAM and control program, I/O control unit 37 for handling data communication with the I/O control apparatus 12, and communication interface 39 for handling data communication with the POS server 40. The POS terminal 30 is connected to input device 32, display 33, and POS printer 34 through a I/O control apparatus 12, which is connected to I/O ports 21a to 23a.

The terminal control unit 38 has a product input processing unit 38-1 for receiving purchased product input data from the input device 32; a product information query unit 38-2 for querying the POS server 40 for price and other product information based on the product code or other input data; a transaction processing unit 38-3 for processing sale transactions based on input data and product data from the POS server 40; a display processing unit 384 generating display data for presentation on the display based on the input purchased product data and the transaction data; a print processing unit 38-5 for outputting print data; and a deletion processing unit 386 for deleting and correcting transaction data such as mistakenly entered purchased product information.

The POS server 40 has a control device (CPU 41) and memory, including ROM 42 and RAM 43. The CPU 41 processes data stored in a buffer 43-6 in RAM 43 according to a control program stored in ROM 42. Also provided in RAM 43 are a product code block 43-1, product name block 43-2, amount block 43-3, and inventory block 43-4. Based on the product information from the POS terminal 30, the CPU 41 extracts the product code, product name, and price data, and generates the product data used for printing a receipt and displaying on the display 33 of the POS terminal 30.

The POS terminal 30 acquires input data from an input device 32 through the I/O control apparatus 12. The input data acquired from the I/O control apparatus 12, may include product information entered from a keyboard or by scanning a barcode with a barcode reader, and may include information about the customer (customer information). If a card reader is connected as one of the input devices 32, a customer credit card or preferred customer (membership) card can be read to acquire information for authorizing a credit card transaction or customer information such as a customer ID number. Product price information can also be displayed for the customer by sending product information generated based on the product data received from the POS server 40 through the I/O control apparatus 12 as display data to the customer display 33. Print data is likewise sent to the POS printer 34 through the I/O control apparatus 12 for receipt printing.

Data extracted from the print data sent from the POS terminal 30 to the I/O control apparatus 12, including credit card transaction data, credit card information read by a credit card reader as the input device 32, data identifying the POS terminal, and data identifying the terminal operator, is sent through the I/O control apparatus 12 to the function-adding apparatus. Based on this data, the function-adding apparatus runs a credit card authorization process. If this authorization process indicates the credit card is authorized for use, the function-adding apparatus sends the credit card paying information through the input/output control apparatus to the POS printer 34, 36 as print data for printing a credit card charge slip on which the customer's signature is then acquired. A credit card transaction processing function can thus be provided.

Note that by connecting an ECR to the input/output control apparatus instead of a POS terminal, printing a receipt and processing a credit card transaction can both be handled in a single efficient process whereas receipt printing and processing credit card transactions are typically separate processes in a conventional POS system.

Providing Added Functionality

An example of adding a function (additional functionality to the POS system) for issuing phone cards ("phone-card-issuing function") to an existing POS system is described next with reference to FIG. 4 to FIG. 6.

An example of a card displayed in open displays in the store and used to purchase a phone card (referred to as a "purchasing card" 70 herein) is shown in FIG. 6A. Phone card purchasing cards 70 printed with the product name, "Phone Card" in this case, and a barcode (purchasing code) and price are displayed in the store. If cards for different amounts, such as 1000 yen, 3000 yen, and 5000 yen, are sold in the store, the content of the barcode printed on each purchasing cards 70 will differ according to the amount. The customer then simply purchases a purchasing card 70 for the desired amount.

As described above, input data (the purchased product data) entered from an input device 32 is sent to the I/O control apparatus 12 while processing the transaction, and then sent from the I/O control apparatus 12 to the POS terminal 30 for transaction processing. The I/O control apparatus 12 checks the received data from the input device 32 to test whether it meets any of the identification criteria stored in the I/O control apparatus and sends the checked input data to the POS terminal 30. Most products do not meet the specified identification criteria, and the input data is therefore sent directly to the POS terminal 30 for transaction processing using the conventional method of the POS system.

When a phone card is purchased, the barcode (product code) of the purchasing card 70 is read by the barcode reader (input device 32). The read product code is sent from the input device 32 to the I/O control apparatus 12. The product code of the purchasing card 70 is stored in the I/O control apparatus 12 as an identification criterion, and the identification unit 15 detects that the product code matches specific identification criteria. The product code of the purchasing card 70 is sent to the POS terminal 30 and to the card-issuing server 50-1, which is one of the function-adding servers 50, at the same time.

When the card-issuing server 50-1 receives a phone card product code, the server runs a specific card-issuing process. FIG. 4 is a function block diagram of a card-issuing server 50-1 according to a preferred embodiment of the invention. The card-issuing server 50-1 has a communication control unit 51, a verification unit 52, data issuing manager 53, and registration unit 54.

When the card-issuing server 50-1 receives the product code of a purchasing card 70 from the I/O control apparatus 12, the verification unit 52 first verifies whether the request is valid (that is, whether the requesting terminal has issuing authority). If authority is verified, the data issuing manager 53 runs the phone card issuing process.

To issue a phone card, a code verification unit 53-1 verifies the received product code and confirms the value of the purchased card 70. The PIN processing unit 53-2 then sends display data for prompting the customer to enter a preferred personal identification number to the I/O control apparatus 12. The I/O control apparatus 12 sends the received display data to the customer display 33. When the customer then enters the desired personal identification number from a customer keypad used as the input device 32, the entered personal identification number is sent from the I/O control apparatus 12 to the card-issuing server 50-1.

When the card-issuing server 50-1 receives the personal identification number, the server accepts the request to issue a phone card, and sends the personal identification number and service content to be provided through the registration unit 54 for storage in the database 55. Based on the type of phone card purchased, the amount, calling time information, and POS system location information, the card-issuing server 50-1 also sends the phone number and personal identification number for receiving the calling service to the I/O control apparatus 12 as print data.

When at least one POS printer or input device is connected to the input/output control apparatus, and data communication between the POS terminal and POS printer or input device is passed through the input/output control apparatus, if the card-issuing server 50-1 detects purchase information for a purchasing card and address information in the print data or input data from the input device, the card-issuing server 50-1 extracts the phone number corresponding to the address information from the database 55 as the retrieved data, sends a personal identification number for calling using the phone card according to the purchase information of the purchasing card, and prints all or part of this data to the phone card.

When at least one POS printer or input device is connected to the input/output control apparatus, and data communication between the POS terminal and POS printer or input device is passed through the input/output control apparatus, if the card-issuing server 50-1 detects phone card identification information and a remaining calling time request for acquiring the remaining calling time left on the phone card in the print data or input data from the input device, the card-issuing server 50-1 calculates the remaining calling time on the phone card based on the phone card identification information, and sends the remaining calling time to the input/output control apparatus as the issued information for printing on the phone card or presenting on a display.

Figure 5:
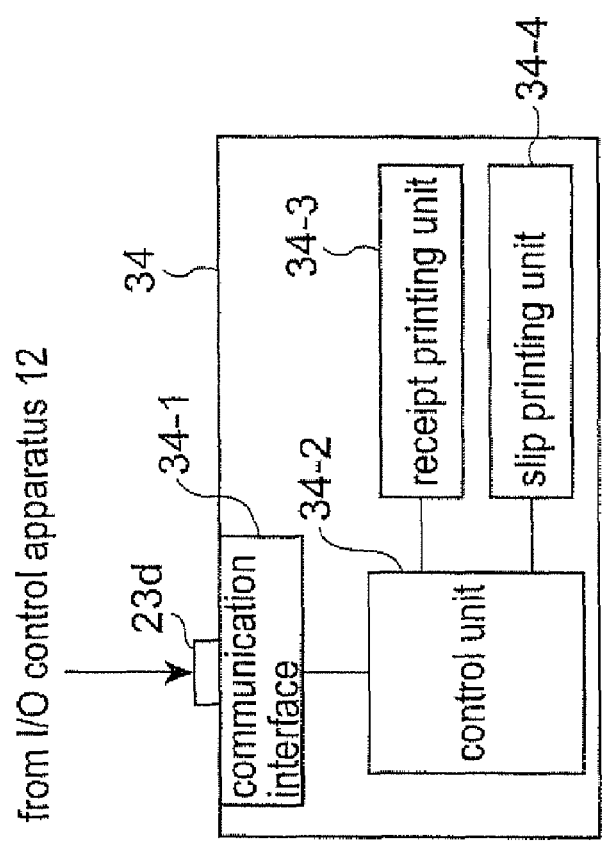
FIG. 5 is a function block diagram of a POS printer such as commonly used in a POS server.

FIG. 5 is a function block diagram of a common POS printer 34. The I/O control apparatus 12 sends print data received from a card-issuing server 50-1 to a POS printer 34 such as shown in FIG. 5. The POS printer 34 has a receipt printing unit 34-3 and a slip printing unit 34-4. The slip printing unit 34-4 can print to relatively thick card stock. When the operator sets a purchasing card 70 into the slip printing unit 34-4, the telephone number and personal identification number sent to the control unit 34-2 from the communication interface 34-1 are printed to the back 71 of the purchasing card 70.

FIG. 6B shows an example of the telephone number and personal identification number printed to the back 71 of a purchasing card 70. FIG. 6C shows a sample of a printed receipt for products A, B, and C, and one phone card. As shown in the sample receipt in FIG. 6C, the personal identification number could be printed on the receipt instead of on the back 71 of the purchasing card 70. Further alternatively, the personal identification number could be acquired by requiring the user to enter the personal identification number twice consecutively when the phone card is first used instead of printing the personal identification number anywhere. Not printing the personal identification number on the phone card helps prevent unauthorized use if the card is lost or stolen.

Further alternatively, the telephone number and personal identification number could be printed on the receipt, and the receipt issued as the valid phone card. This enables the purchasing card 70 to be recovered at the checkout counter after payment is made so that the purchasing cards can be reused.

Furthermore, if phone cards are sold by printing a telephone number or other information to a purchasing card 70 or other type of card but the existing POS printer 34 does not have a slip printing function, the present invention enables providing this new service by simply connecting a second printer 36 with a slip printing capability.

While the customer is prompted to enter a desired personal identification number in the foregoing example, the personal identification number could be issued automatically by the card-issuing server and printed. Cards can be issued more quickly in this case because the customer does not need to enter a personal identification number.

When the customer that purchased the phone card then desires to use the phone service, the customer calls the specified telephone number and enters the personal identification number as directed. The communication control device then queries the database 55 via the card calling management server 57 as shown in FIG. 4 to verify the remaining calling time and personal identification number and provide telecommunication services accordingly.

OTHER EMBODIMENTS

Figure 7:
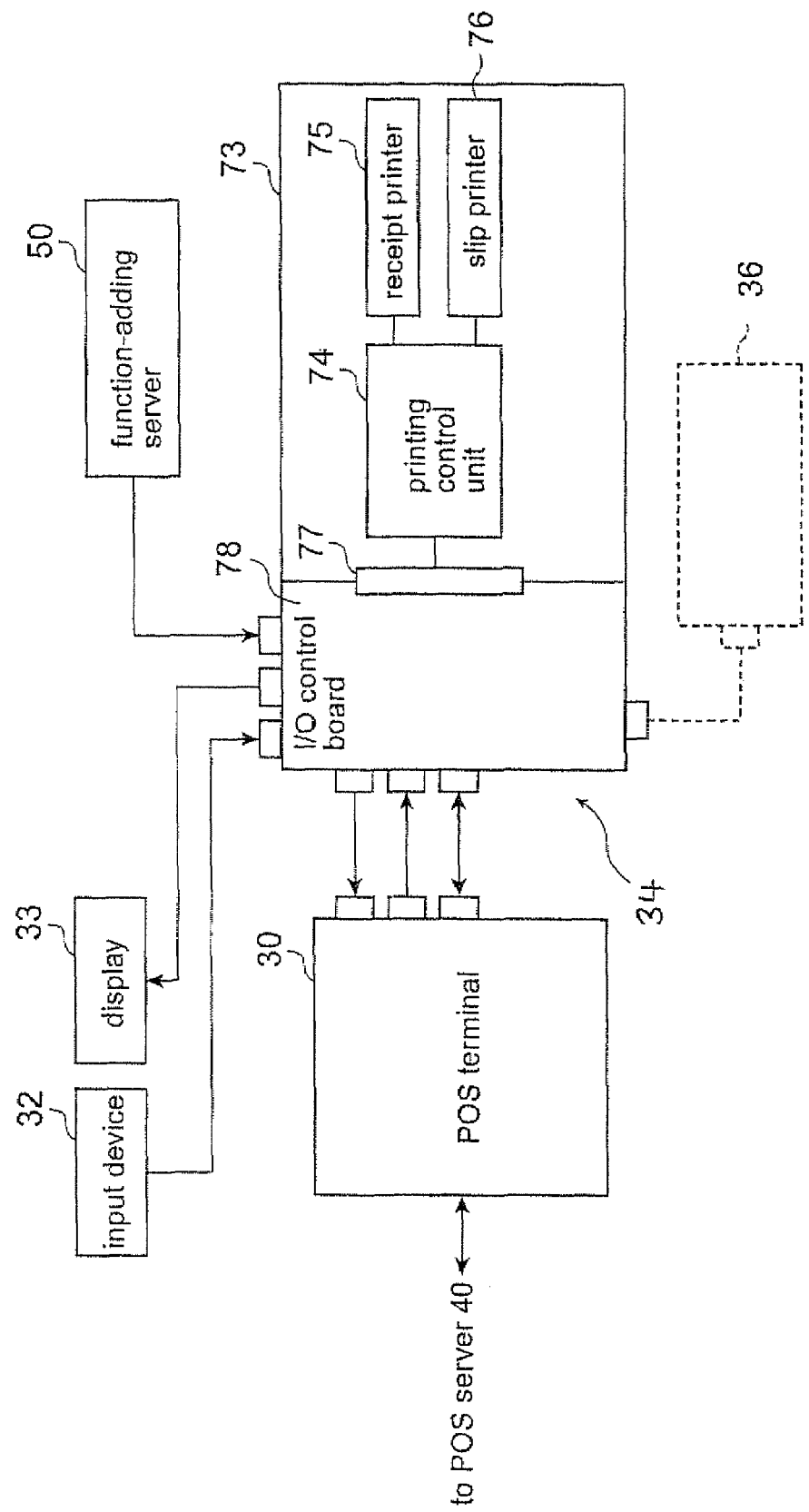
FIG. 7 is a block diagram of a POS system and POS printer according to another preferred embodiment of the present invention.

FIG. 7 shows a POS system and POS printer according to another embodiment of the present invention. In the POS system shown in FIG. 7, the POS printer 34 has I/O control board 78 and a printing unit 73. The I/O control board 78 is connected through a connector 77 to the printing unit 73, and is built in to the POS printer 34. The I/O control board 78 could be a removable connection. Except for the mode of connecting to the POS printer 34, this I/O control board 78 is functionally identical to the I/O control apparatus 12 shown in FIG. 2. Another printer 36 could also be connected to the POS printer 70 shown in FIG. 7.

When the printing control unit 74 receives print data from the I/O control board 78, the printing control unit 74 distributes the print data to the receipt printer unit 75 or slip printer unit 76 of the POS printer 73 according to the specific printing format for printing.

Figure 10:
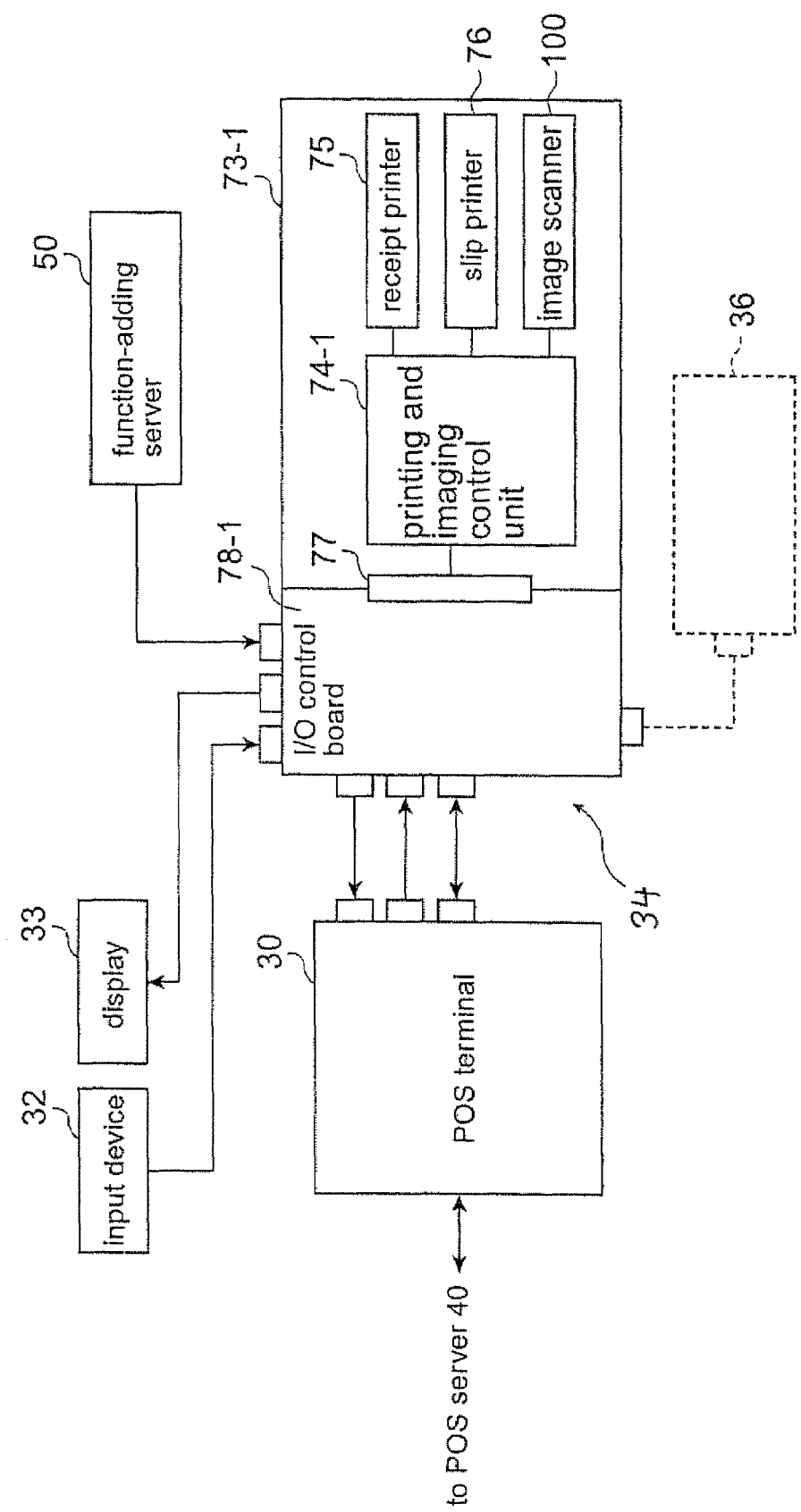
FIG. 10 is a block diagram of a POS system and POS printer according to another preferred embodiment of the present invention.

FIG. 10 shows a POS system and POS printer according to a further embodiment of the invention. In the POS system shown in FIG. 10, the POS printer 34 has an I/O control board 78-1 that may be the same as the I/O control board 78 in FIG. 7 and a printing and imaging processing unit 74-1 instead of the printing control unit 74 which is built into POS printer 34-1. The I/O control board 78-1 is connected through a connector 77 to the printing and imaging processing unit 73-1, and are built in to the POS printer 34. The I/O control board 78-1 could be a removable connection. Except for the mode of connecting to the POS printer 34, this I/O control board 78-1 is identical to the I/O control apparatus 12 shown in FIG. 2. Another printer 36 could also be connected to the POS printer 34-2 shown in FIG. 10.

When the I/O control board 78-1 receives print data from the POS terminal 30 in a POS printer 34-2 having an integral image scanner 100, the I/O control board 78-1 sends the print data to the printing and imaging control unit 74-1. The printing and imaging control unit 74-1 then distributes the print data to the receipt printer 75 or slip printer 76 according to the specific printing format for printing. Print data received from a function-adding server 50 is likewise printed by the POS printer 34-2. As a result, printing involved with the added functionality provided by the function-adding server 50 can be executed on the POS printer 34-2.

Image data captured by the image scanner 100 can also be output through the I/O control board 78-1 to the POS terminal 30 or function-adding server 50. This image data could be captured from a credit card, check, or driver license, for example. All or a part of this image data, account number information read from a check, date information, information for identifying the I/O control port (input/output control apparatus), information for identifying the POS terminal, operator identification information, and amount information can be stored to the data storage unit 14 of the I/O control board 78-1.

An image scanning device could also be connected as an input device 32. In this case, the captured image data can be output through the I/O control board 78-1 to the POS terminal 30 or function-adding server 50 in the same way as the foregoing POS printer 70-1 having an integral image scanner.

Figure 11:
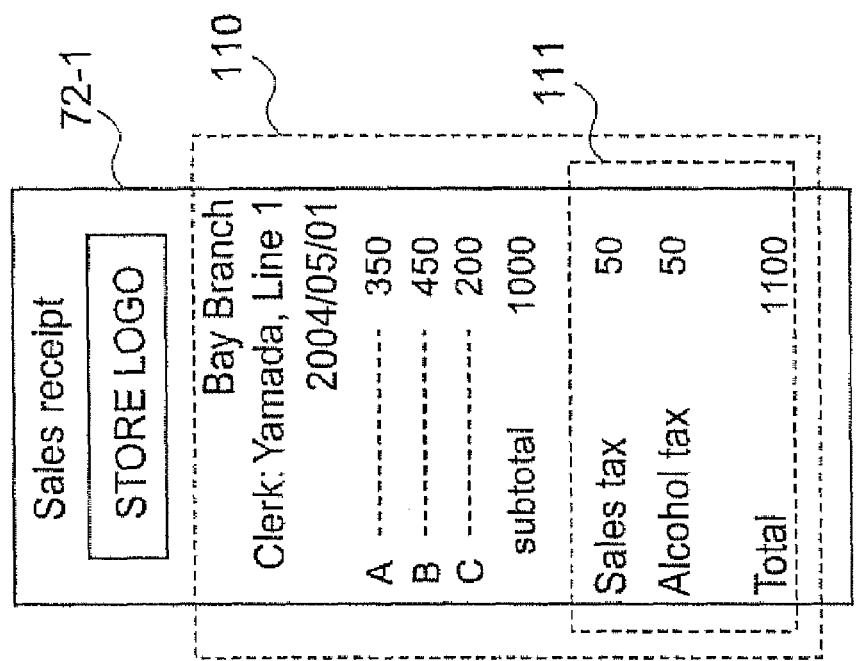
FIG. 11 is an example of a receipt printed in another embodiment of the invention.

FIG. 11 showing a print sample of a receipt 72-1 printed for journal data or tax reporting purposes. In the print data sent from the POS terminal 30 to the input/output control apparatus, the information that requires recording in the journal is the journal data 110. Other information such as the store logo that is printed on the sale receipt does not need recording in the journal. The tax data 111 required for tax collecting and reporting includes the purchase total and the applied tax. Information printed on the receipt 72-1 can thus be selectively extracted for specific uses.

The I/O control board 78-1 stores all or part of the received data together with all or a part of the following data to the data storage unit 14: data for identifying the I/O control board 78-1, data identifying the operator, and data identifying the date. Furthermore, data can be stored in a compressed format or in the raw (uncompressed) data format. The received data is then transferred from the data storage unit 14 to the function-adding server 50 at regular intervals, when requested by the function-adding server 50, when the remaining capacity in the data storage unit 14 reaches a specified level, or when the received data meets specific conditions. The transmission data is automatically encrypted and decrypted during transmission.

The function-adding server 50 stores the received data in a database 55. In response to operator commands received from the input/output control apparatus, the function-adding server 50 also executes typical database operations on the database 55, including searching and serving data, data backup, computation, deletion, compression and expansion, encryption and decryption, printing, and display processes.

Print data can thus be converted to an electronic journal, and tax-related information can be extracted, without adding any journal data archiving function to the POS terminal. Providing this added function helps save paper and improves job efficiency.

Transaction Processing and Phone Card Issuing Procedure

Figure 8:
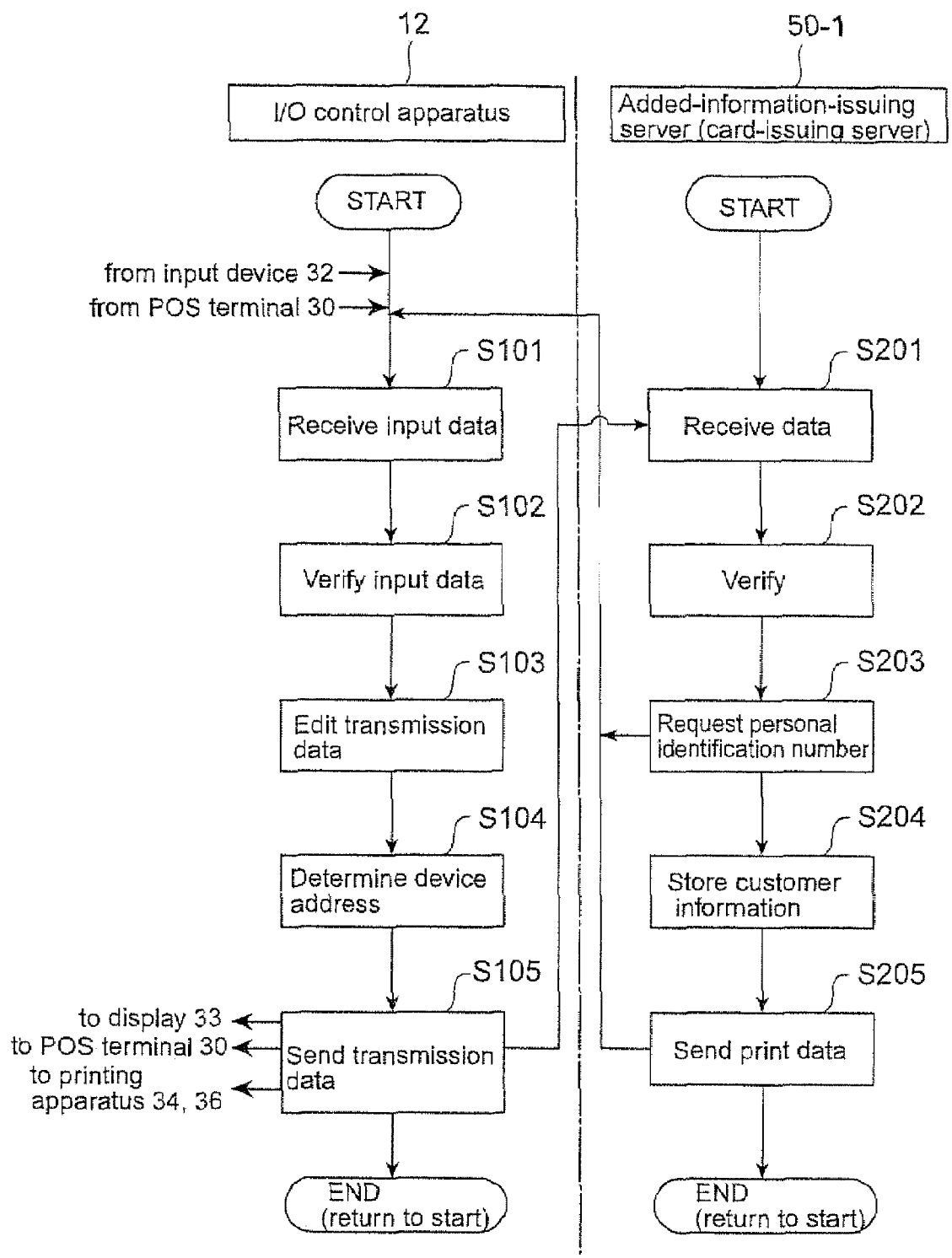
FIG. 8 is a flow chart of the process run by the input/output control apparatus and function-adding server (card-issuing server)
Figure 9:
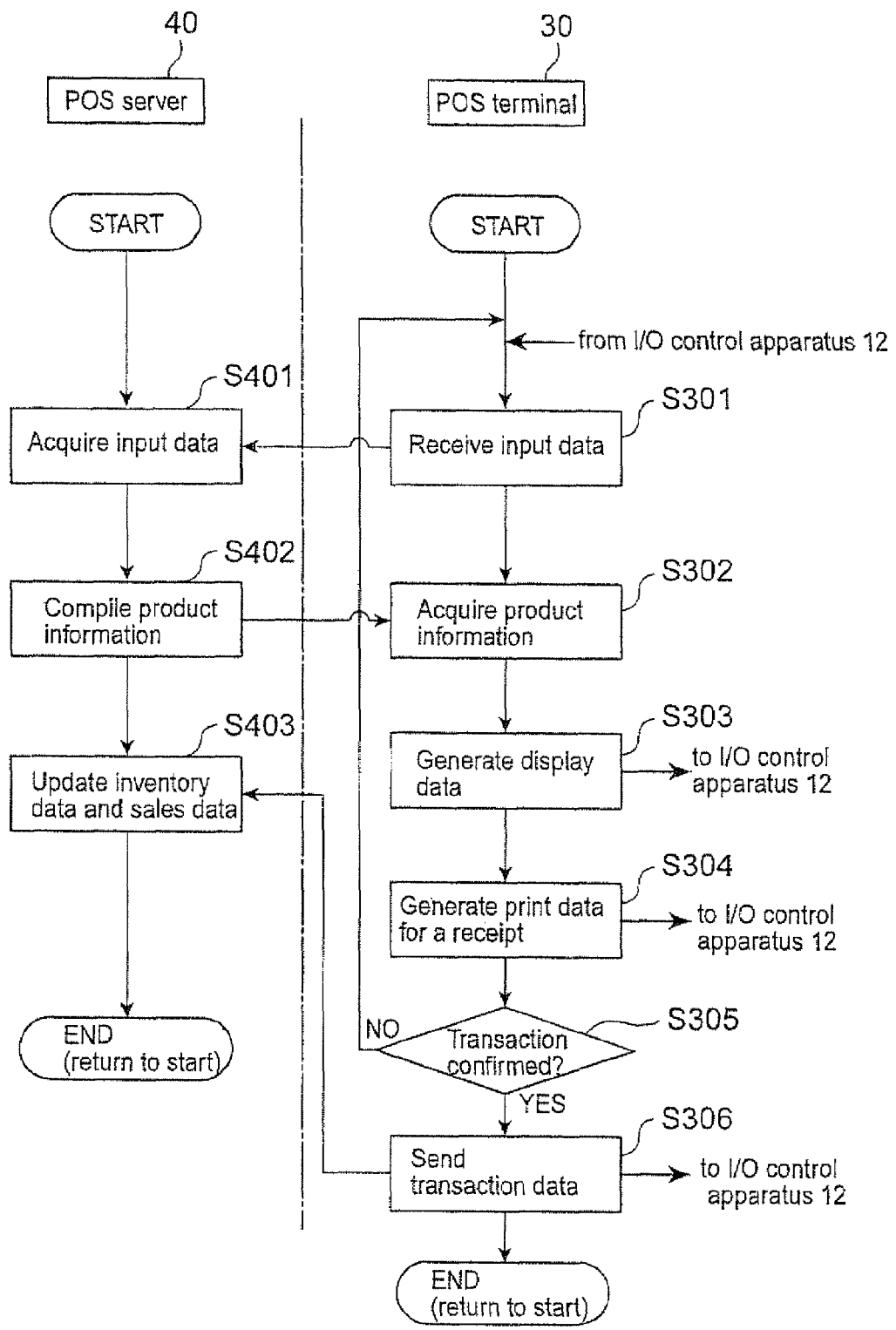
FIG. 9 is a flow chart of the process executed by the POS terminal and POS server.

Operation of a POS system according to the present invention is described below with reference to the flow charts shown in FIG. 8 and FIG. 9. FIG. 8 is a flow chart of the processes executed by the I/O control apparatus 12 and function-adding server (card-issuing server) 50-1, and FIG. 9 is a flow chart of the processes executed by the POS server 40 and POS terminal 30.

When purchased product information is entered from an input device 32 during a transaction, the input data is sent to the I/O control apparatus 12. When the I/O control apparatus 12 receives the purchased product information from the input device 32 (S101), the identification unit determines if the received data meets specific identification criteria (S102). Depending on whether the received data meets the specific identification criteria and whether the first process or a second process is thus executed, transmission data is then edited (S103), the addressee (output destination) is determined (S104), and the transmission data is sent to the specific device determined by the executing process. Note that directly relaying the received data is also included in the concept of "editing" by the I/O control apparatus 12 as used herein.

If the received data from the input device 32 does not meet the specific identification criteria, the received data is sent directly to the POS terminal 30 based on the first process. If the product code indicating a phone card purchase is received from the input device 32, said product code will be detected by the received data identification process (S102). If said product code is detected, the received data is sent to the POS terminal 30 according to the first process, and the received data is also sent to the card-issuing server 50-1 (S105) after first applying other steps (S103, S104) according to the second process.

When the card-issuing server 50-1 receives phone card purchasing information (S201), issuing authority is verified (S202), and a request to enter a personal identification number (PIN entry request) is output (S203).

This PIN entry request sends display information prompting the user to enter a personal identification number to the I/O control apparatus 12. The I/O control apparatus 12 confirms the received data (S101, 102), and after executing a particular process, outputs display data to the display 33 requesting the user to enter the personal identification number (S103 to S105). When the I/O control apparatus 12 then receives the personal identification number from the input device 32 (S101), a specific process is again executed (S102 to S103), and the edited transmission data is sent to the card-issuing server 50-1 (S104 S105). When the card-issuing server 50-1 receives the personal identification number, the server stores a customer record containing the personal identification number and the phone card purchase information (S204). The server then sends print date for the phone number for accessing the phone service and the personal identification number to the I/O control apparatus 12 (S205).

When the I/O control apparatus 12 receives the print data from the card-issuing server 50-1 (S101), the I/O control apparatus 12 identifies the data (S102) and thus recognizes print data from the card-issuing server 50-1 (S102). The I/O control apparatus 12 then edits the data as required (S103), and sends the print data to the appropriate printer 34 or 36 (S104, S105). If the personal identification number is printed on the receipt, the personal identification number is stored and the print data is edited in the print data editing routine after the print data is received so that the personal identification number is printed to a specific location on the receipt.

Whether to print the personal identification number, and where to print the personal identification number on a card (slip) or receipt could also be determined as desired by the customer.

The operation of the POS terminal 30 and POS server 40 are described next with reference to FIG. 9.

When the POS terminal 30 receives purchased product information from the I/O control apparatus 12 (S301), the POS terminal 30 sends a product information query to the POS server 40 (S301).

When the POS server 40 receives the query (S401), the POS server 40 retrieves the product information and sends the information to the POS terminal 30 (S402).

When the POS terminal 30 receives the product name, price, and other product information from the POS server 40 (S302), the POS terminal 30 generates and sends the data to be displayed or printed as the display data and receipt-printing data to the I/O control apparatus 12 (S303, S304). When all purchased product information has been entered, a transaction confirmation is sent from the input device 32. When the POS terminal 30 receives this transaction confirmation (S305 returns yes), the POS terminal 30 calculates the purchase total and sales tax, for example, outputs the transaction information as display and print data, and also outputs the transaction data to the POS server 40 at the same time (S306). The POS server 40 updates the product inventory data and sales data based on the received transaction data (S403).

Returning to FIG. 8, when the I/O control apparatus 12 receives display data or print data from the POS terminal 30, the I/O control apparatus 12 outputs the data to the display 33 or POS printer 34 according to the normal procedure. The display 33 thus sequentially displays data based on operator input from the input device 32, such as the name and price of the purchased product, and then displays the transaction information at the end of the transaction. The POS printer 34 prints the print data from the I/O control apparatus 12 to a receipt. The POS printer could print the purchased product data to a receipt as the data is entered, or the POS printer could batch print the data to the receipt after the final total is determined. When the data is printed can be controlled by adjusting the timing at which the POS terminal 30 sends the print data to the I/O control apparatus 12, the timing at which the I/O control apparatus 12 sends the print data to the POS printer 34, and when the print timing of the POS printer 34.

EXAMPLES OF YET OTHER ADDED FUNCTIONS

Examples of other functions that can be provided by means of an input/output control apparatus according to the present invention are described below.

Example 1

Connecting an input/output control apparatus of this invention to a product maintenance server operated by a manufacturer enables adding a function for remote maintenance to, for example, monitor the use of consumables such as ink ribbons and ink, or a function for providing remote software upgrades.

Remote maintenance can be provided by the input/output control apparatus reading maintenance information (such as ink consumption, remaining ink level, print volume, number of automatic paper cutting operations, the amount of paper consumed, number of times the power switch is turned on/off) from the printer, and sending this maintenance information to the function-adding apparatus at regular intervals or when requested by the function-adding apparatus.

Other services such as remote inventory management could also be provided to, for example, automatically ship ink cartridges from the manufacturer when a store's inventory of ink cartridges drops to a certain level, or bill according to ink consumption. Wasteful replacement of ink cartridges, and problems resulting from running out of ink, can thus be remotely prevented.

Example 2

A function for automatically collecting subscription fees for software used on the POS system, for example, can be added by connecting the POS system to an automatic payment server through an input/output control apparatus according to the present invention.

Example 3

A credit card payment function can be easily added by connecting a credit authorization terminal (CAT), which is used to verify credit card authorization, to the input/output control apparatus of the invention.

Example 4

High value-added services based on a membership or preferred customer card, for example, can also be offered.

Example 5

The present invention can also provide a check payment function, a payment function using digital data captured from check images, and improved reliability. Conventional systems read the account number information printed on each check and then based on the account number execute one or all of the following: verifying whether the account exists, whether the account can be used, checking the remaining balance, and checking whether the account is on a list of banned customer accounts. The POS terminal application must then determine whether to accept the account number.

Using the input/output control apparatus of the present invention, however, the account number information read from the check is sent through the input/output control apparatus to a function-adding apparatus. The function-adding apparatus then checks all or at least one of whether the account exists, whether the account can be used, checking the remaining balance, and checking whether the account is on a list of banned customer accounts; determines whether the account number can be accepted, and sends the acceptance result to the input/output control apparatus. Whether payment can be accepted and the transaction is complete is thus known.

A check processing function can thus be added to an existing POS system without introducing a new POS system application, and check payments can be processed easily.

Reading and storing an image of a check at the same time the account number is read from the check also provides evidence in the event the account number of the check was misread or a check is used illegally. The POS terminal application used for this purpose in a conventional system receives check image data from a printer having an internal image scanner or from a separate image scanner, and either stores the image data in the POS terminal or sends the image data to the check processing server for storage on the server side. Using an input/output control apparatus according to the present invention enables saving the image data or sending the image data to a specific server without changing the POS terminal application, thereby easily saving proof if a check is misread or used illegally, and thus improving reliability.

Example 6

Another function that can be added uses "digital change" to speed up the transaction time (checkout time) in a store and eliminate the need for customers to carry small change. This is achieved by storing customer change less than a specified amount as digital change on a particular management server. When an uneven amount is due for a purchase, the balance kept on the digital change server is used together with the amount paid by the customer to complete the transaction so that the customer does not need to carry much change around.

Example 7

If print data is sent to the printer through the input/output control apparatus after a payment is made at the checkout counter or after an order is paid for and an order receipt (ticket) is issued, the input/output control apparatus extracts the product information from the print data and sends the product information to a second input/output control apparatus. The second input/output control apparatus sends print data to a connected printer as cooking instructions in a restaurant kitchen or shipping instructions, for example. As a result, instructions can be automatically routed in a kitchen or warehouse.

Example 8

In addition to the transaction information normally printed to a receipt, all or part of information such as customer identification information, operator identification information, a serial print number, and input/output control apparatus identification information is added to the print data sent from the function-adding apparatus and print data sent from the input/output control apparatus, and this information is sent to a plurality of input/output control apparatuses connected to the POS system. A plurality of input/output control apparatuses store the information, and select and send the print data to a particular printer based on instructions identifying what information to print. These instructions are included with the print command sent from an input device or function-adding apparatus connected to the input/output control apparatuses. This arrangement enables the operator to print using the nearest printer or input/output control apparatus. This also enables working around a malfunctioning printer, for example, and to shorten the time needed to resume printing.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A POS system for processing transaction information including purchased product information, the POS system comprising:

an input device for entering transaction information;

a display for displaying display data including at least a portion of the transaction information;

a printer for printing print data including at least a portion of the transaction information;

a POS terminal for acquiring or receiving data including transaction information from the input device, calculating a purchase total, and generating and outputting at least a portion of the display data and at least a portion of the print data; and an input/output control unit in communication with the POS terminal and at least one of the input device, the display and the printer, the input/output control unit comprising:

a plurality of input ports, at least one of which is configured to receive data from the POS terminal, and at least one of which is configured to receive data from at least one other device in communication with the input/output control unit, an identification unit for detecting whether data received through at least one of the plurality of input ports meets a specific identification criterion, a processing procedure memory for storing a processing procedure for executing a first process when the data received through the at least one of the plurality of input ports does not meet the specific identification process, and for executing a second process when the data received through the at least one of the plurality of input ports meets the specific identification criterion, a data processing unit for processing received data and outputting all or a portion of the received data to at least one of the printer or the display based on whether the received data meets the specific identification criterion, an identification criteria storage unit for storing identification criteria, each criterion being stored in relation to the input port or ports to which that criterion applies, and a data storage unit for storing data received through the input ports;

wherein the input/output control unit further includes, or is configured to communicate with, at least one function-adding component configured to provide a functional application to the POS terminal.

2. A POS system as described in claim 1, wherein, in executing the second process, the input/output control unit outputs all or part of the data received through the at least one of the plurality of input ports to one of the devices with which the input/output control unit is in communication according to the type of data received from the at least one function-adding component.

3. A POS system as described in claim 1, wherein the input/output control unit, after detecting that data received through the at least one of the plurality of input ports meets the specific identification criterion, transmits that data to the at least one function-adding component in executing the second process and outputs information received from the at least one function-adding component as print data.

4. A POS system as described in claim 1, wherein:

the at least one function-adding component is an externally located value-added-information server for outputting information data including at least one of a personal identification number corresponding to data transmitted from the input/output control unit, update data based on data transmitted from the input/output control unit, and extracted data retrieved by searching a specific database based on data transmitted from the input/output control unit; and when the identification unit detects data received through at least one of the plurality of input/output ports that meets a specific identification criterion, the input/output control unit sends that data to the value-added-information server according to the second process and outputs information received from the value-added-information server as print data.

5. A POS system as described in claim 4, wherein the input device comprises a customer input device, and the value-added-information server comprises a personal identification number processing unit for prompting input of a personal identification number to the input/output control unit via the customer input device when the identification unit detects data received through at least one of the plurality of input/output ports that meets a specific identification criterion and issuing additional information when the input personal identification number meets a specific condition.

6. A POS system as described in claim 4, wherein the value-added-information server comprises a card issuing apparatus for issuing phone cards based on purchases.

7. An input/output control unit for use in a POS system having an input device for entering transaction information, a display for displaying display data including at least a portion of the transaction information, a printer for printing print data including at least a portion of the transaction information, a POS terminal for acquiring or receiving data from the input device, calculating a purchase total, and generating and outputting at least a portion of the display data and at least a portion of the print data, the input/output control unit comprising:

a plurality of input ports, at least one of which is configured to receive data from the POS terminal, and at least one of which is configured to receive data from at least one other device in communication with the input/output control unit;

an identification unit for detecting whether data received through at least one of the plurality of input ports meets a specific identification criterion;

a processing procedure memory for storing a processing procedure for executing a first process when the data received through the at least one of the plurality of input ports does not meet the specific identification process, and for executing a second process when the data received through the at least one of the plurality of input ports meets the specific identification criterion;

a data processing unit for processing received data and outputting all or a portion of the received data to at least one of the printer or the display based on whether the received data meets the specific identification criterion;

an identification criteria storage unit for storing identification criteria, each criterion being stored in relation to the input port or ports to which that criterion applies; and a data storage unit for storing data received through the input ports;

wherein the input/output control unit further includes, or is configured to communicate with, at least one function-adding component configured to provide a functional application to the POS terminal.

8. A method for processing externally-received functionality from a function-adding component and adding it to a POS system having a POS terminal for acquiring or receiving data including transaction information, calculating a purchase total, and generating and outputting at least a portion of the print data, a printer for printing print data including at least a portion of the transaction information, an input/output control unit in communication with the POS terminal and the printer, the method comprising the steps of:
  (a) performing an identification operation to determine whether select data received by the input/output control unit meets a specific identification criterion;
  (b) executing a first process of sending the received data to the POS terminal or the printer, when it is determined that the select received data does not meet the specific identification criterion;
  (c) executing a second process of sending the select received data to the function-adding component, instead of or in addition to sending the select received data to the POS terminal, when it is determined that the received data meets the specific identification criterion; and
  (d) obtaining, in response to the specific identification criterion, additional data from the function-adding component to enable the POS system to perform at least one additional independent function.

9. The method of claim 8, wherein the POS system further has an input device for entering data and a display for displaying display data including at least a portion of the transaction information, wherein the second process further comprises processing the additional data from the function-adding component in accordance with the steps of:
  (d)(1) outputting display data requesting specific input from the input device;
  (d)(2) sending data entered through the input device to the function-adding component according to the display data requesting specific input displayed on the display; and
  (d)(3) sending print data received from the function-adding component in response to step (d)(2) to the printer.

10. The method of claim 9, wherein step (b) further comprises sending one or more of: a personal identification number, update information, and information extracted from the function-adding component to the printer, when it is determined that the select received data does not meet the specific identification criterion.

11. The method of claim 9, wherein the data input in step (d)(2) includes a personal identification number, and wherein step (d)(3) further comprises sending the personal identification number to the printer.

12. The method of claim 9, wherein the select data on which an identification operation is performed in step (a) includes purchased product information.

* * * * *